May 27, 1930.  W. A. MULLER  1,760,205
DRAINER
Filed Sept. 17, 1928    2 Sheets-Sheet 1
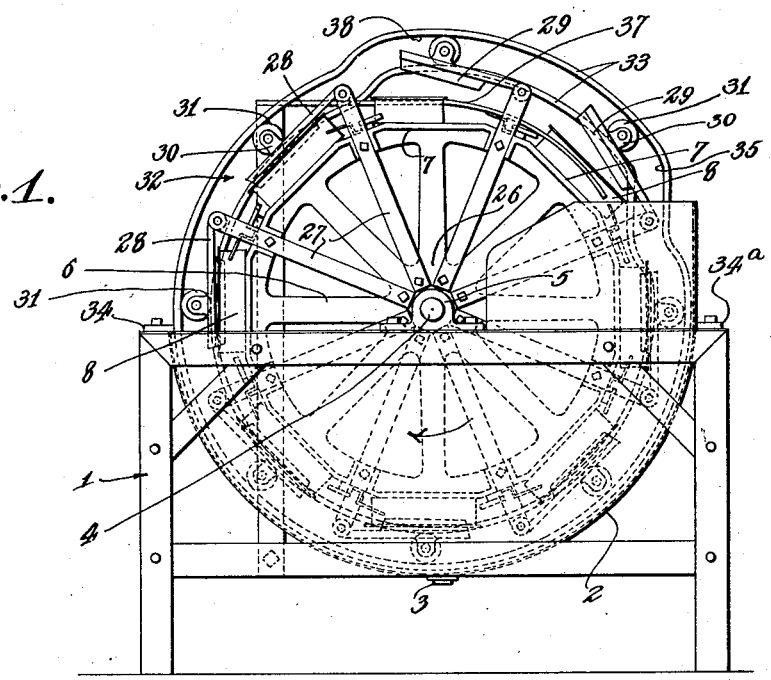

May 27, 1930.  W. A. MULLER  1,760,205
DRAINER
Filed Sept. 17, 1928   2 Sheets-Sheet 2
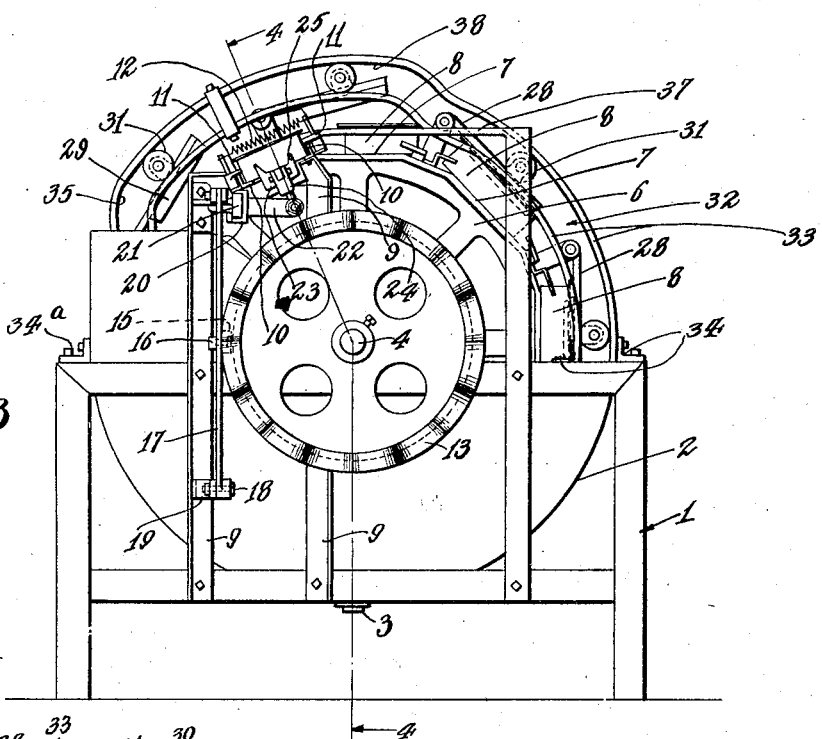
Fig. 3
Fig. 5.
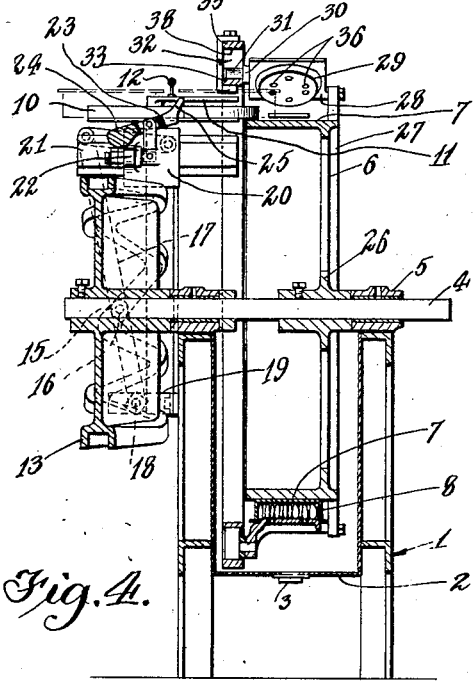
Fig. 4.
Inventor
Wesley A. Muller
By Lyon & Lyon
Attorneys Patented May 27, 1930

1,760,205

UNITED STATES PATENT OFFICE

WESLEY A. MULLER, OF MONTEREY, CALIFORNIA, ASSIGNOR TO CALIFORNIA PACKING CORPORATION, OF SAN FRANCISCO, CALIFORNIA, A CORPORATION OF NEW YORK

DRAINER

Application filed September 17, 1928. Serial No. 306,606.

This invention relates to drainers, and is more particularly related to a device adapted for the purpose of draining liquids from materials such as fish after the same have been packed in cans or the like.

An object of this invention is to provide a device for draining water or other liquid from fish or similar food products after the fish or food products have been positioned within cans or the like preparatory to the canning of the fish or other food products.

Another object of this invention is to provide a device adapted for draining liquid from food products after the same have been positioned within cans and for compressing the food products into position in the cans preparatory to the canning of the food products.

Other objects and advantages of this invention it is believed will be apparent from the following detailed description of a preferred embodiment thereof as illustrated in the accompanying drawings:

In the drawings:

Figure 1 is a side elevation of a drainer embodying this invention.

Figure 2 is a top plan view thereof.

Figure 3 is a rear elevation of the drainer embodying this invention.

Figure 4 is a sectional edge elevation taken substantially on the line 4—4 of Figure 3.

Figure 5 is an enlarged sectional view illustrating the compressing foot as moved into position to compress the food within the can preparatory to the draining of the liquid from said food.

In the preferred embodiment of this invention illustrated in the accompanying drawings, 1 indicates a frame which may be of any suitable or desirable form and which supports a drain trough 2 into which the liquid to be drained from the food is collected and drained by any suitable or desirable means such, for example, as the drain outlet 3 leading to the similar or other suitable point of disposal of the liquid drained from the food products.

The frame 1 supports a shaft 4 in bearings 5. Secured to the shaft 5 is a reel 6 which provides a multiplicity of flat surfaces 7 on which the cans 8 containing the food products such, for example, as fish are adapted to rest during the compressing of the food and the draining of the liquid therefrom.

Means are provided for feeding the cans 8 on to the surfaces 7 of the reel 6 in timed relation, which means are preferably of the following construction:

Supported by the frame members 9 of the frame 1 is a guideway formed of spaced angle irons 10. Secured to the angle irons 10 are fingers 11 which are yieldably connected together by means of a spring 12 and act to yieldably hold the cans 8 from passing freely through the guideway provided by the angle irons 10. Secured to the shaft 4 is a pusher actuating cam 13 which is formed to provide a multiplicity of individual can sections of substantially V-shape, and in which the cam roller 15 is supported. The cam roller 15 is carried by a pin 16 secured to an operating lever 17. The operating lever 17 is pivotally secured by means of a pin 18 to a bracket 19 secured to one of the frame members 9. The opposite end of the lever 17 is pivotally secured to a slide 20 which is mounted to reciprocate upon a slide bar 21 secured to the frame 1.

The slide 20 is provided with an extension 22 and the extension 22 is pivotally secured to a pusher block 23. The pusher block 23 is weighted at its rear end 24 so that its forward end 25 is yieldably urged upward into position to engage the can 8 and push the same between the fingers 11 on to one of the surfaces 7 of the reel 6 in proper timed relation as is determined by the cam 13. The block 13 is pivotally supported so that the cans 8 may be pushed directly over the block 23 by any suitable form of conveyor means (not shown) or the cans may be fed to the guideway provided by the spaced angle irons 10 by hand, or in any other desired manner.

After the cans pass from over the block 23, the weighted end 24 thereof will pivot the block 23 upward into position to cause the same to engage the rear portion of the can 8 and as the slide 20 is reciprocated by the movement of the cam roller 15 in the camways provided by the cam 13, the can will be caused to pass on to the reel 6.

Means are provided for holding the cans on the surfaces 7 of the reels 6 for compressing the food contents within the cans 8 and for permitting the food contents of the cans 8 to be drained as the reel 6 is rotated which means are preferably of the following construction:

A spider 26 is secured to the shaft 4 and provides outwardly extending arms 27. Pivotally secured to the end of each arm 27 is an arm 28 which carries a presser foot 29. Secured to the arm 28 by a bracket 30 is a cam roller 31 which is adapted to ride in a camway 32 formed by the spaced irons 33. The spaced irons 33 are held stationary by securing the same to the frame 1 by means of brackets 34 and 34$^a$. The shaft 4 may be driven from any suitable form of prime mover by any suitable or desirable type of drive connection from the prime mover to the shaft 4.

After a can 8 has been fed upon the surfaces 7 of the reel 6, and the reel 6 rotates, the corresponding foot 29 is moved downwardly by its cam roller 31 through the depression point 35 of the cam-way 32 so that the presser foot 29 is pressed into the can 8 to compress the food in the can to the desired degree. The presser foot 29 is provided with a multiplicity of drain holes 36 through which the liquid from the cans 8 is permitted to drain as the cans 8, with the presser feet in contact, are moved around by the reel 6 to invert the cans 8. The presser feet 29 are formed to approximately the contour of the cans 8 but not so that the feet 29 fit accurately within the cans 8, but sufficient space is permitted between the edges of the feet 29 and the rims of the can 8 to allow for a certain play in the mechanism for operating the feet 29, and also to provide for a drainage space for the drainage of the liquid from the food contents of the can around the foot 29, as well as through the drain holes 36.

Means are provided for ejecting the cans from off the reel 6 after the contents of the can have been pressed into the desired position and drained, which means preferably include an angularly disposed guide rod 37 which passes over the reel 6 in position to engage the cans 8 and cause the same to slide off of the reel 6 on to any suitable form of conveyor or receiving device.

In order to permit the cans 8 to be ejected off from the reel 6 by the rod 37, the presser feet 29 are moved out of engagement with the cans immediately in advance of the rod 37 by the cam rollers 31 passing through the detracking portion 38 of the cam-way 32.

Having fully described my invention, it is to be understood that I do not wish to be limited to the details herein set forth, but my invention is of the full scope of the appended claims.

I claim:

1. In a device of the class described, the combination of a conveying device, means for feeding open filled cans on to said conveying device, means actuated in timed relation with the advancement of said cans for compressing the contents of said cans, means for inverting the cans with the compressing means in contact therewith to permit the liquid to drain from the can, and means operated in timed relation with said conveying device for releasing the compressing means to permit the cans to be delivered from said conveying device.

2. In a device of the class described, the combination of a circular conveyor, mounted with its axis in substantially horizontal position, means for feeding filled cans to said conveyor, means for compressing the contents of the cans while the cans are on the conveyor, means for driving the conveyor to carry the cans to inverted position to drain the contents of the cans, and return the cans to upright position, and means for removing the cans from the circular conveyor.

3. In a device of the class described, the combination of a conveyor, means for feeding filled cans on to the conveyor, means adapted to enter the cans for compressing the contents of the cans within the cans on the conveyor, and means for inverting the filled cans with the contents thereof compressed to drain the cans.

4. In a device of the class described, the combination of a conveyor, means for feeding filled cans on to the conveyor, presser feet for clamping the cans in position on the conveyor and for compressing the contents of the cans within the cans, means for actuating said feet, and means for inverting the filled cans with the contents thereof compressed to drain the cans.

5. In a device of the class described, the combination of means providing can receiving surfaces, means for feeding the cans continuously to the first said means on to said surfaces, means for clamping the cans in position on said surfaces and for compressing the contents of the cans within the cans, and means for rotating the first said means to invert the cans to drain the same.

6. In a device of the class described, the combination of a circular conveyor providing can receiving surfaces, means for feeding cans on to the surfaces, presser feet, cam means for actuating the presser feet to clamp the cans on the conveyor and to compress the contents of the cans, and means for rotating the circular conveyor to invert and drain the cans.

7. In a device of the class described, the combination of a circular conveyor, means for feeding filled cans on to the conveyor, means for compressing the contents of the cans within the cans on the conveyor, means for inverting the cans with the contents thereof compressed to drain the cans, means for releasing the compressing means, and means for extracting the cans from the circular conveyor in upright position.

8. In a device of the class described, the combination of a circular conveyor, means on the circular conveyor for receiving filled cans in upright position, means for compressing the contents of the cans within the cans on the conveyor, means for feeding cans on to the conveyor in timed relation with the operation of said compressing means, and means for inverting the filled cans with the contents thereof compressed to drain the cans.

9. In a device of the class described, the combination of a circular conveyor, means on the circular conveyor for receiving filled cans in upright position, means for compressing the contents of the cans within the cans on the conveyor, means for feeding cans on to the conveyor in timed relation with the operation of said compressing means, means for inverting the filled cans with the contents thereof compressed to drain the cans, means for releasing the compressing means when the cans have been returned to upright position on the circular conveyor, and means for extracting the upright cans from the conveyor.

Signed at Monterey, California, this 24th day of August, 1928.

WESLEY A. MULLER.